(No Model.)
W. KENNISH.
TUBE VALVE.
No. 274,447. Patented Mar. 20, 1883.
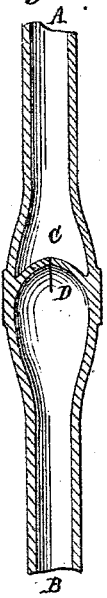
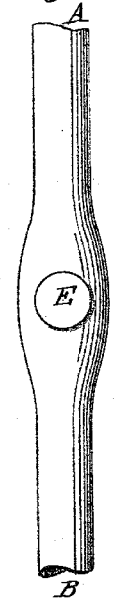
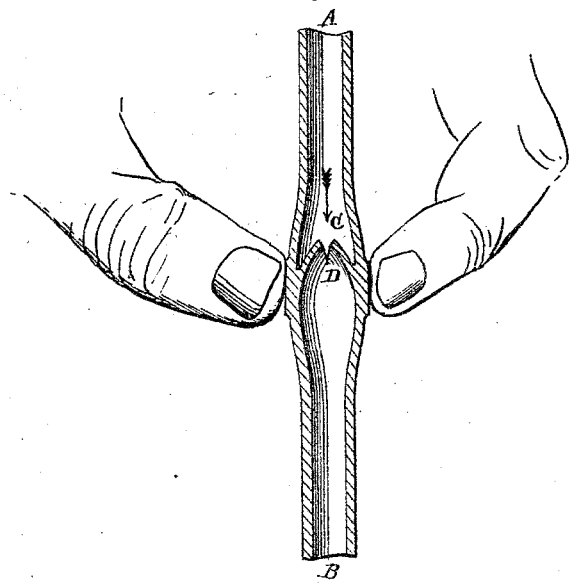
Witnesses:
James H. Hunter.
A. M. Todd.
Inventor.
William Kennish

UNITED STATES PATENT OFFICE.

WILLIAM KENNISH, OF NEW YORK, ASSIGNOR TO C. B. DICKINSON, OF BROOKLYN, N. Y.

TUBE-VALVE.

SPECIFICATION forming part of Letters Patent No. 274,447, dated March 20, 1883.

Application filed January 19, 1881. (No model.)

*To all whom it may concern:*

Be it known that I, WILLIAM KENNISH, of New York, in the county of New York and the State of New York, have invented a new and useful Improvement in Tube-Valves, of which the following is a full and exact description.

The object of my invention is to provide elastic or pliable tubing with a valve which in its normal state will permit the passage of liquids in only one direction, but which, upon external compression of the tube, will open to the flow of liquids either way.

In the accompanying drawings, Figures 1 and 3 are longitudinal sections of my invention, and Fig. 2 is an external view of the same.

It consists of a tube composed of soft rubber or other elastic substance with a semispherical or curved diaphragm, C. In the center of the diaphragm and evenly dividing it an incision is made with a sharp instrument after the tube with its diaphragm is cast or molded. In Fig. 1 this incision is shown to be closed, and while in this form liquid could not find a passage through the valve from the direction of A, as any pressure from that side would tend to compress the diaphragm, and thus close the incision. A flow can be maintained from the direction of B, as pressure from that side expands the diaphragm, and thus opens the passage. When it is desired to cause a reflow from the direction of A, the tube is compressed externally, as shown in Fig. 3, when the diaphragm is forced upward, the incised opening expanded, and regurgitation will occur.

Fig. 2 gives the external form of my invention, the slightly raised circular piece E being formed in the mold to indicate the point for external pressure.

I claim—

An elastic tube provided with a slit valve of hollow hemispherical shape, formed by extending the inner walls of the tube inward toward the center, as shown, said tube being provided with external indicating compression-points, substantially as set forth.

WM. KENNISH.

Witnesses:
JAMES H. HUNTER,
A. M. TODD.